United States Patent [19]

Rossman

[11] 4,423,333
[45] Dec. 27, 1983

[54] HORIZONTAL AXIS WIND ENERGY CONVERSION SYSTEM WITH AERODYNAMIC BLADE PITCH CONTROL

[76] Inventor: Wendell E. Rossman, 3137 N. 53rd St., Phoenix, Ariz. 84018

[21] Appl. No.: 344,957

[22] Filed: Feb. 2, 1982

[51] Int. Cl.³ .............................................. F03D 7/04
[52] U.S. Cl. ...................................... 290/44; 290/55; 416/44; 416/139
[58] Field of Search ................. 290/44, 55; 415/8, 12, 415/13; 416/23, 44–46, 52, 53, 139, 140

[56] References Cited

U.S. PATENT DOCUMENTS 3,874,816 4/1975 Sweeney et al. ............... 416/139 A
4,352,629 10/1982 Cheney, Jr. ..................... 416/139 A
4,374,631 2/1983 Barnes .............................. 416/44 A Primary Examiner—J. V. Truhe
Assistant Examiner—W. E. Duncanson, Jr.
Attorney, Agent, or Firm—Kenyon & Kenyon

[57] ABSTRACT

The horizontal axis wind turbine converts wind into electrical energy and includes a pitch control vane with a flyweight mechanism on each rotor blade to provide aerodynamic efficiency at operating wind velocities, near constant speed and zero lift pitch of the rotor blades when speeds exceed the design speed of the system. A gravity neutralization means composed of a bevel gear and pinions couples the blades together while a flyweight arrangement connected to the bevel gear acts to neutralize centrifugal torque on the blades.

34 Claims, 12 Drawing Figures

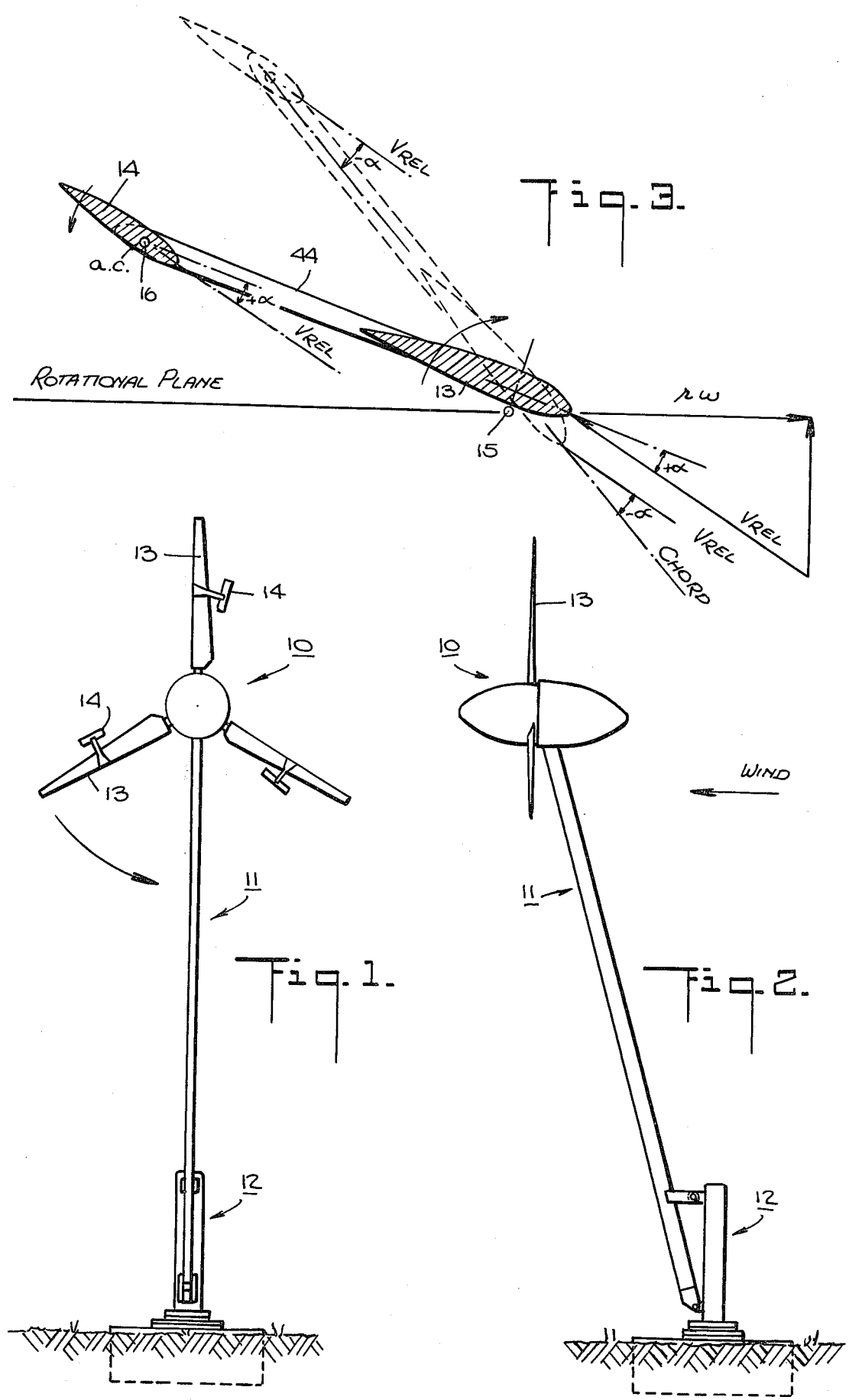

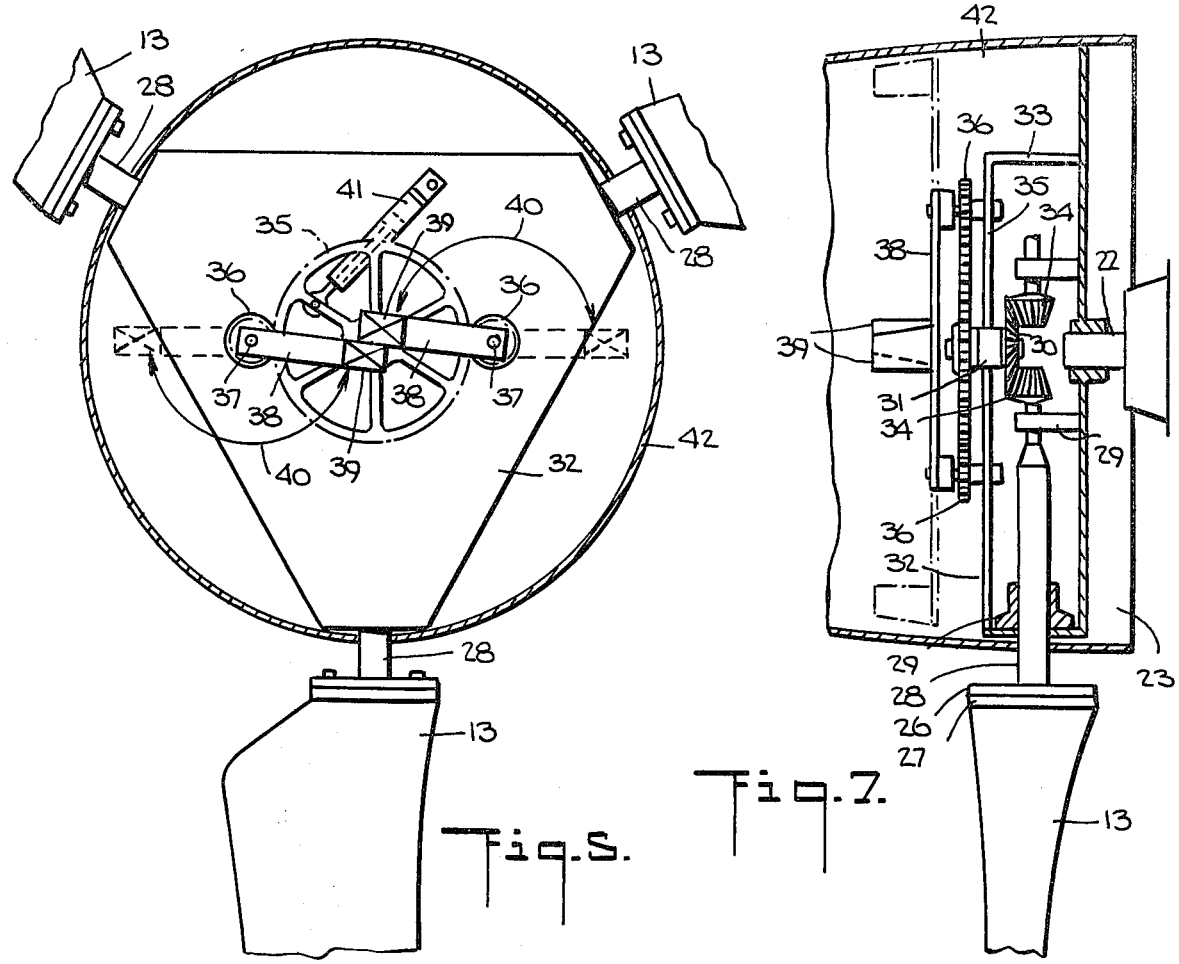
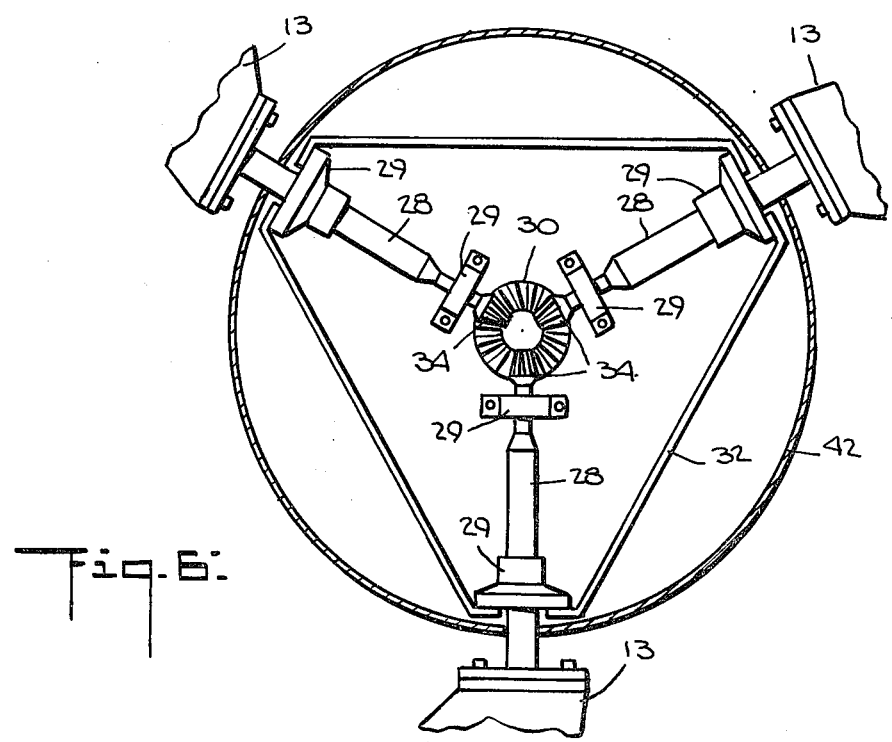

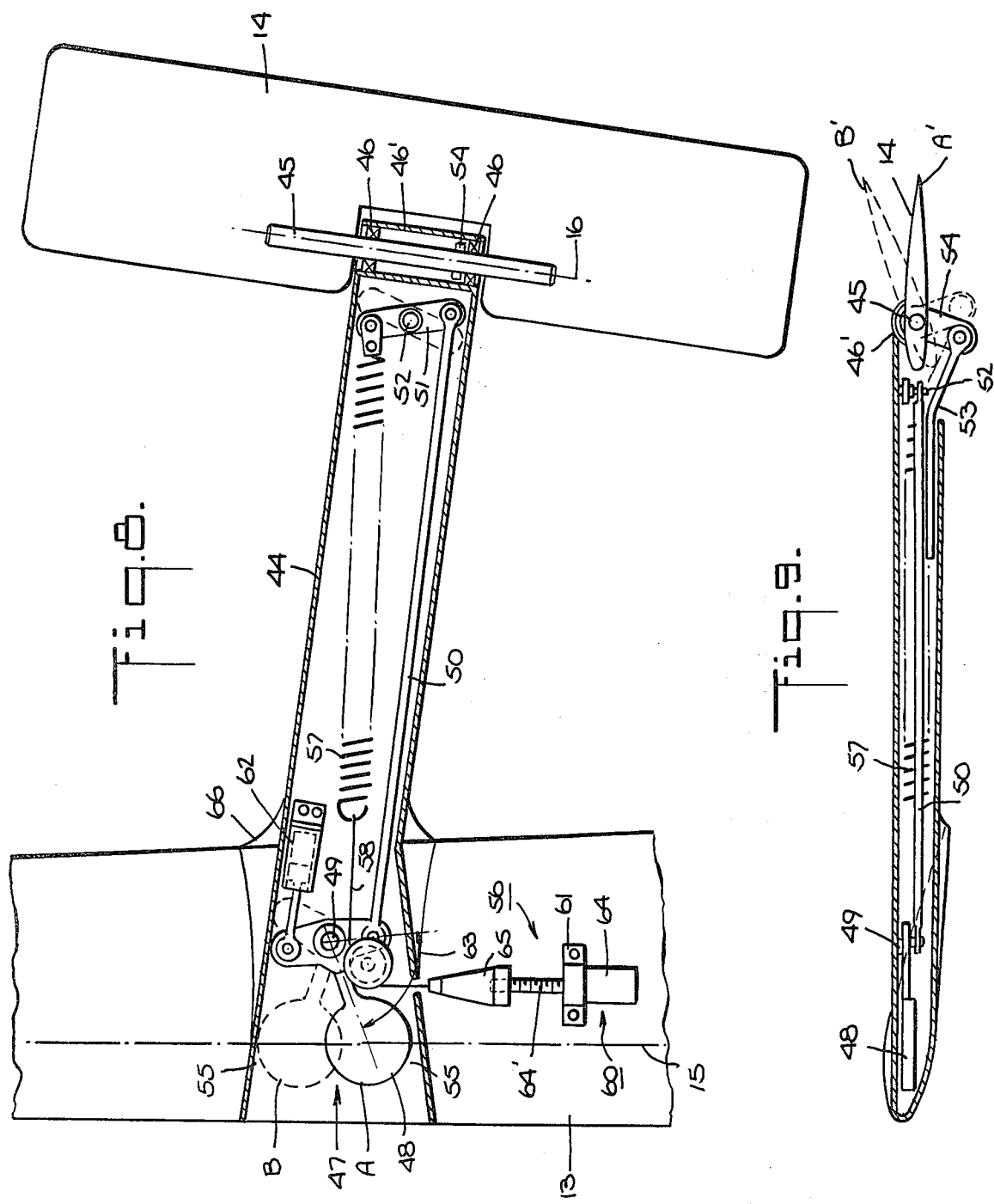

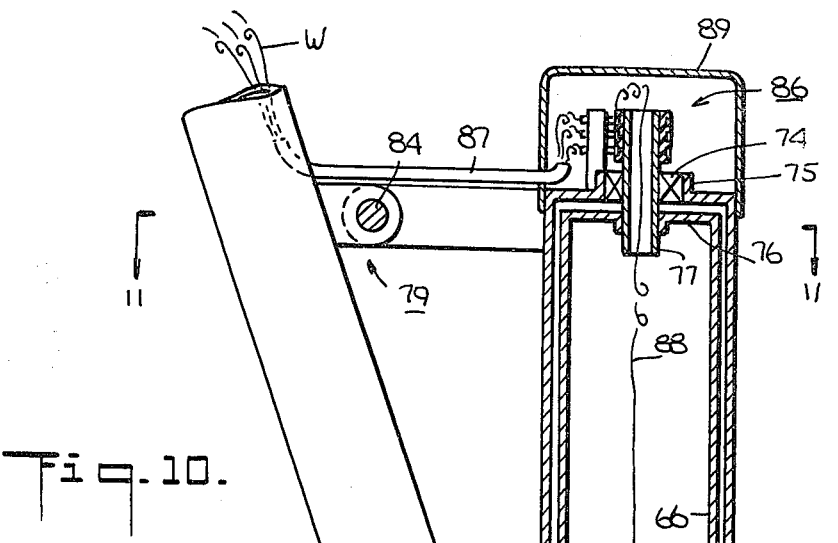
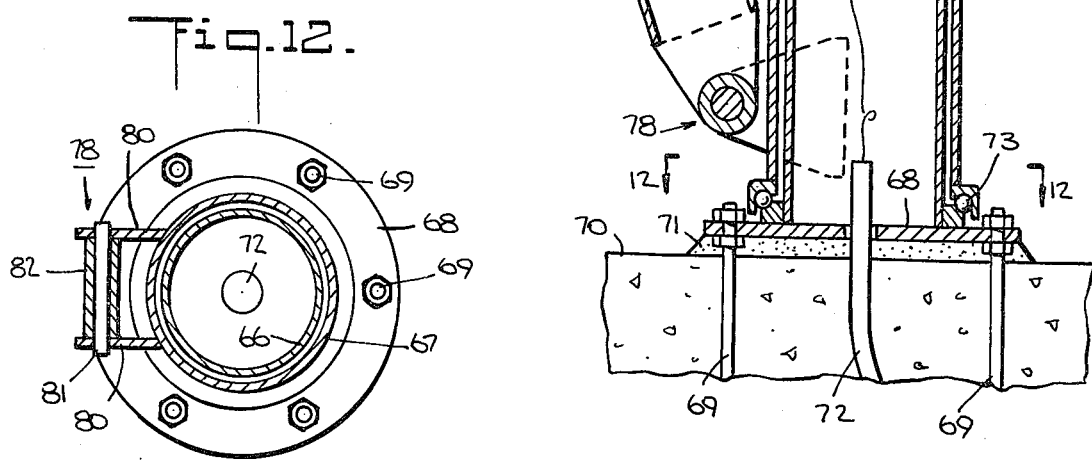
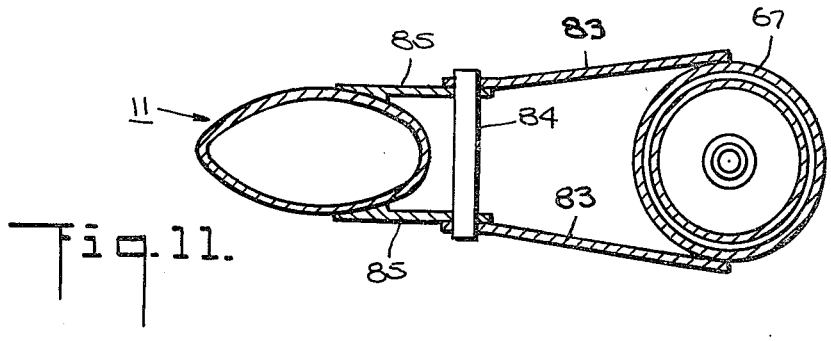

HORIZONTAL AXIS WIND ENERGY CONVERSION SYSTEM WITH AERODYNAMIC BLADE PITCH CONTROL

This invention relates to a wind energy conversion system.

Heretofore, various types of systems have been proposed for converting wind energy into electrical energy. Generally, these systems which are referred to as wind energy conversion systems (WECS) can be oriented about a horizontal axis or a vertical axis. Presently existing horizontal WECS usually have a multi-blade rotor assembly with blades fastened to a hub and shaft as well as a speed step-up transmission or gear system connecting the shaft to an electric DC or AC generator. In order to provide alignment with the wind, the rotor assembly is mounted to rotate around the yaw axis on the top of a mast. The yaw axis, as is well known, is the normal or vertical axis of rotation. Electric current transmission is achieved through step or collector rings at the vicinity of a yaw axis bearing at the top of the mast.

The existing WECS also employ a number of speed and over-speed controls. In one case, a speed control is used to vary the pitch of the blades through a centrifugal force activating mechanism within the hub and/or by servo-motor control, thus either stalling or feathering the blades. Yet another technique uses a control to rotate the rotor and hub assembly about the yaw axis so that the blades are no longer normal to the oncoming wind. This reduces the component of the wind velocity that is normal to the rotor blades, and therefore reduces aerodynamic efficiency. Other techniques include folding the blades downwind; turning the rotor from a perpendicular to a horizontal plane; twisting small areas of the blade tips normal to the rotational direction so that they may act as air brakes; using spring restrained spoilers which open up at predetermined wind and rotational speeds; centrifugally activating spring restrained air brakes; and using electric load banks in which a load is imposed through the generator to the rotor.

Generally, only larger conversion systems employ sophisticated translation of upwind anemometer and electric load information in the blade pitch and yaw position. Many WECS have upper wind speed limits above which they shut down altogether.

All, except the larger conversion systems, are therefore limited to essentially a fixed pitch blade turbine for the effective range of operating wind velocities. This results not only in considerable aerodynamic inefficiency in wind speeds other than the design speed but also in an inaccurate speed control since stall or feathering mechanisms require considerable overspeeding until they activate. It is therefore not possible for most WECS to produce reasonable constant voltage (or frequency in the case of AC generation) relative to varying wind velocities and/or connected loads. The more accurate speed control systems which adjust blade pitch to relative wind, and thus generate constant current, are too expensive to be economically justifiable for smaller WECS.

As is known, the towers which are used in wind energy conversion systems are usually stationary. One exception features a triangulated, strutted and braced tower-like base, rolling on several points on a large circular track. However, this construction requires substantial structured members and is economically unattractive for smaller WECS.

In summary, present state of the art WECS are limited to power generation with inaccurate upper voltage limits and frequency holding, coupled with only partial aerodynamic efficiency due to a fixed angle of attack of the blades.

Accordngly, it is an object of the invention to provide a relatively efficient wind energy conversion system of simple construction.

It is another object of the invention to reduce the undesirable voltage and frequency fluctuations caused by rapid fluctuations in the angular rotational speeds of a rotor of a wind energy conversion system due to wind speed and load variations.

It is another object of the invention to control the pitch of the blades of a wind energy conversion system.

It is another object of the invention to provide a multi-blade horizontally disposed wind energy conversion system which is able to operate at peak efficiency independent of wind velocity and/or connected load.

It is another object of the invention to provide a simple mechanism for feathering a pitch controlled rotor blade in a wind energy conversion system.

It is another object of the invention to provide a relatively economical means of maintaining the rotor blades of a wind energy conversion system at the most efficient attitude with respect to an oncoming wind.

It is another object of the invention to provide a wind energy conversion system of few structural members to facilitate erection and maintenance.

Briefly, the invention provides a wind energy conversion system (WECS) which has a rotor assembly disposed on a horizontal axis. The rotor assembly includes at least one pivotally mounted turbine blade disposed in a radiating manner for rotation about an aerodynamic axis perpendicular to the horizontal axis and a pitch control vane mounted on the turbine blade for moving the blade into a deliberate angle of attack in relation to a relative wind passing over the blade.

The rotor assembly also includes a hub plate on which a plurality of turbine blades are mounted and a shaft which is connected to the hub plate and to a generator for generating an electrical current during roation of the shaft.

In addition, the wind energy conversion system (WECS) includes a mast which supports the rotor assembly at an elevated height and which is mounted angularly to a vertical axis for rotation about the vertical axis. The height at which the rotor assembly is carried is such that the rotor assembly can convert a wind force into electrical energy. A base is also provided for mounting the mast in such a manner to permit take-off of the electrical energy generated by the generator. For example, the base may be constructed of a vertically disposed hollow stem and a tube which is rotatably mounted concentrically about the stem. The mast is, in turn, connected angularly to the tube to rotate about the stem. In addition, a collector ring assembly is disposed on the stem while at least one cable passes through the mast to connect the generator to the collector ring assembly. A lead also extends from the collector ring assembly through the stem to an external terminal.

The system also has a gravity neutralization means connecting the blades together in order to rotate simultaneously about the respective aerodynamic axes. In this regard, the gravity neutralization means includes a bevel gear mounted on the hub plate in relatively rotatable relation and a pinion gear mounted on each blade in meshing engagement with the bevel gear. In addition, a centrifugal torque neutralizing means is provided to permit resistance-free pitch angle changes of the blades at design rotational speeds.

Each pitch control vane is pivotally mounted on a strut which extends from a blade and is set to effect a deliberate angle of attack in the blade. Any subsequent pivoting of the control vane causes the turbine blade to assume the most effective angle of attack in relation to the relative wind or load, i.e., through the inclination of the plane of the control vane relative to the chord plane of the turbine blade. Thus, the wind energy conversion system will seek out the highest aerodynamic efficiency at all times independent of wind velocity and/or load.

In accordance with the invention, rotation of a ptich control vane occurs at increasing speeds of the rotor blades. To this end, means are provided for rotating the vane when the angular velocity of the associate turbine blade exceeds a predetermined angular velocity so as to cause the blade to rotate on the aerodynamic axis thereby decreasing the angular velocity of the blade. This means is in the form of a centrifugal flyweight assembly which is disposed within the strut for rotating the vane on the strut.

The flyweight assembly includes a flyweight which is pivotally mounted on a pivot axis, a pair of rests which are mounted on the strut to limit movement of the flyweight in opposite directions and a tensioning means which is provided to bias the flyweight towards one of the rests. The mounting of the flyweight is such that as the speed of the turbine blades increases, centrifugal force causes the flyweight to pivot away from the rest against the force of the tensioning means.

The wind energy conversion system thus has a mast which is angularly disposed to a vertical axis, a rotor assembly composed of turbine blades and pitch control vanes for establishing the angle of attack of the turbine blades, a gravity neutralization means connecting the blades together, a centrifugal torque neutralizing means for the blades and a centrifugal flyweight assembly for pivoting the pitch control vanes.

These and other objects and advantages of the invention will become more apparent from the following detailed description taken in conjunction with the accompanying drawings wherein:

FIG. 1 illustrates a front view of wind energy conversion system according to the invention;

FIG. 2 illustrates a side view of the WECS of FIG. 1;

FIG. 3 illustrates an isometric representation of a combination of a rotor blade and associated pitch control vane construction in accordance with the invention;

FIG. 5 illustrates a view of a centrifugal torque neutralization means according to the invention;

FIG. 6 illustrates a view of a gravity neutralization means constructed in accordance with the invention;

FIG. 7 illustrates a side view of the centrifugal torque and gravity neutralization means of FIG. 6;

FIG 8 illustrates a partial cross-sectional view of the mounting of a vane on a blade in accordance with the invention;

FIG. 9 illustrates a side view of the centrifugal flyweight assembly for pivoting a vane;

FIG. 10 illustrates a cross-sectional view of a base for mounting a mast of the WECS in accordance with the invention; and FIG. 11 illustrates a view taken on line 11—11 of FIG. 10; and FIG. 12 illustrates a view taken on line 12—12 of FIG. 10.

Figure 4:
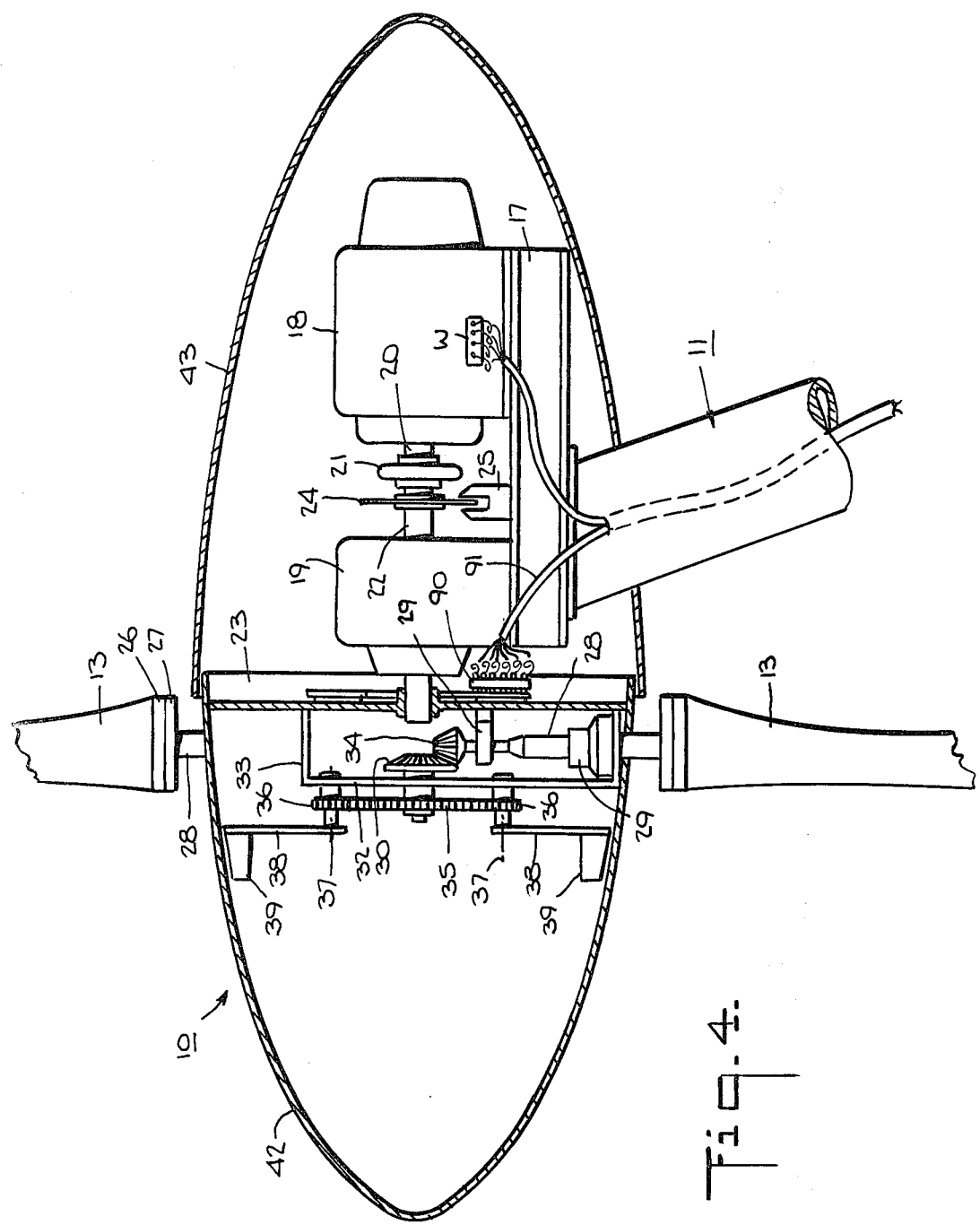
FIG. 4 illustrates a cross-sectional view of a rotor assembly in accordance with the invention.

Referring to FIG. 1, the wind energy conversion system, hereinafter WECS, includes a rotor assembly 10, a mast 11 for supporting the rotor assembly 10 and a base 12 for supporting the mast 11. As shown in FIG. 2, the mast 11 is disposed in angular relation to a vertical axis of the base 12 and has a symmetrical air foil cross-section.

As shown in FIG. 1, the rotor assembly 10 includes a plurality of turbine blades 13 which are disposed in radiating manner about a horizontal axis. At least some of the blades 13 carry a pitch control vane 14 for moving the blade 13 into a deliberate angle of attack in relation to a relative wind passing over the blade 13.

As shown in FIG. 3, each blade 13 is mounted for rotation about an aerodynamic axis 15 while the associated vane 14 is able to rotate about an aerodynamic axis 16 spaced from and approximately parallel to the aerodynamic axis 15 of the blade 13.

Referring to FIG. 4, the rotor assembly 10 has a strong-back frame 17 secured to the upper end of the mast 11 in any suitable fashion, for example, by welding. This frame 17 carries a generator 18 and a speed-up transmission 19. The generator 18 has a shaft 20 which is coupled via a flexible coupling 21 to a shaft 22 of the transmission 18 and is provided with electrical wiring W which passes into the interior of the mast 11 for drawing off electrical current. In addition, a braking disc 24 is mounted on the shaft 22 to cooperate with a caliper brake 25 mounted on the frame 17. This brake 25 can be actuated in any suitable manner (not shown) to stop rotation of the shaft 22 via the braking disc 24. The shaft 22, speed-up transmission 19 and generator 18 are connected to function as an in-line power train assembly.

Referring to FIGS. 4 and 6, the rotor assembly 10 also includes a hub plate 23 which is fixed to the shaft 22 and which carries the turbine blades 13 thereon. As shown, each turbine blade 13 has a base plate 26 which is secured via bolts (not shown) to an end plate 27 of a blade-root shaft 28. The blade-root shaft 28 is, in turn, journalled in a pair of bearings 29, one of which is a thrust-bearing, secured in suitable manner to the hub plate 23. Each turbine blade 13 includes, for example, two lateral straps (not shown) which are affixed to the base plate 26 and extend outward at the surface of the blade and which are bolted to the blade.

One of the forces imposed on the blades 13 is simple gravitation since the aerodynamic center 15 does not coincide with the center of gravity of the blade. Left uncontrolled, the heavier side of the blade 13 will fall earthward. Thus, by linking the blades 13 together via a gravity neutralization means, the sum of the moment arms about the aerodynamic centers 15 of all the blades 13 on one side of the rotor assembly 10 can be made equal to the sum of the moment arms of the blades on the other side in all rotational positions.

As shown in FIG. 5, the gravity neutralization means includes a bevel gear 30 which is journalled via a bearing 31 in a triangular-shaped cover plate 32 (FIG. 5) which is mounted on the hub plate 23 via a cage frame 33. The gear 30 meshes with a pinion gear 34 on the free end of each blade-root shaft 28. The pinion gears 34 thus allow the turbine blades 13 to rotate simultaneously.

By interlocking the rotation of the blades 13 about their aerodynamic centers, the blades 13 are balanced relative to gravity at any pitch angle and are also forced to pitch in unison.

Another force which is imposed on the blades is a centrifugally induced torque. This force also acts about the aerodynamic centers 15 of the blades 13. Due to the eccentric mass distribution of the blades 13 and appended pitch control vanes 14 relative to their aerodynamic centers 15, the blades 13 will tend to seek, for each mass particle, the largest circular orbit, thus causing centrifugally induced torque. This torque is non-linear and stabilizes only in a zero pitch position of the blade 13. That is, each blade 13 together with a control vane 14 generates a moment arm about the aerodynamic axis 15 of the blade 13. The forces are approximately parabolic in magnitude being zero at 0° pitch, maximum at 45° pitch and receding to zero at 90° pitch of the blade 13. The moment developed is substantial and must be neutralized through its parabolic force curve.

Accordingly, a means is provided for neutralizing the centrifugally induced torque. As shown in FIGS. 5 and 7, this means includes a drive gear 35 which is secured to and co-acts with the bevel gear 30 and a pair of smaller driven gears 36. Each driven gear 36 is mounted on the plate 32 via a suitable bearing to rotate about an axis 37 and is in meshing engagement with the drive gear 35. The compound is such that for a 90° pitch change of the blades 13, the driven gears 36 will rotate 180°. In addition, a radially extending lever arm 38 is affixed to each driven gear 36 and carries a flyweight 39 in the form of a block at the free end.

As shown in FIG. 5, during standstill, the gears 36, lever arms 38 and flyweights 39 are balanced thus permitting full pitch rotation of the blades 13. This, in turn, allows alignment of the blades 13 to the best pitch angle (and maximum shaft torque) at extremely low wind velocities.

During rotation of the rotor assembly 10, the flyweights 39 tend to rotate about the axes 37 of the gears 36 thus describing arc movements 40. By design, the moment arm generated about an axis 37 and, in turn, the axis of the blade root shaft 28 is parabolic. By proper selection of the masses of the flyweights 39, the magnitude of this parabolic curve can be made equal to the generated centrifugal torque, thus imparting pitch change freedom to the blades 13.

In this way, the pitch control vanes 14 become effective since all moment forces are thus available for blade pitch control.

Referring to FIG. 5, a hydraulic damper 41 is mounted on the plate 32 and is connected to the drive gear 35 to tangentially damp the gear 35. This serves to dampen out rapid and undesirable blade oscillations.

Referring to FIG. 4, a paraboloidial spinner 42 is fixed to the hub plate 23 to encase the gravity neutralization means and centrifugal torque neutralization means while a similar shroud 43 is fixedly disposed about the power train comprised of the speed-up transmission 19 and generator 18.

Referrng to FIG. 8, each pitch control vane 14 is mounted on an outer third of a blade 13 via a strut 44. In addition, each vane 14 is fixed to a shaft 45 which is rotatably mounted via bearings 46 in a sleeve 46' fixed in an end of the strut 44 to pivot about the aerodynamic axis 16. In addition, a means is provided for rotating the vane 14 in response to the angular velocity of the blade 13 exceeding a predetermined angular velocity in order to cause the blade 13 to rotate on the aerodynamic axis 15 in a direction to decrease or increase the angular velocity of the blade.

As shown in FIG. 8, the means for rotating the vane 14 includes a centrifugal flyweight assembly 47 which is disposed within the strut 44. This flyweight assembly is connected to the vane 14 so that at increasing blade speed, the vane 14 is rotated to change the angle of attack of the blade 13 and thus decrease or increase the torque on the blade 13. The flyweight assembly 47 includes a flyweight 48 which is rotatably mounted within the strut 44 on a suitable pin 49. As indicated, the flyweight 48 is shaped to have a bulbous end and a rocker arm. In addition, the assembly 47 includes a rod 50 which is pivotally connected to one end of the rocker arm of the flyweight 48 and which extends along and within the strut 44. The opposite end of the rod 50 is pivotally connected to a rocker arm 51 which is pivotally mounted on a pin 52 in the strut 44. In addition, the end of the rod 50 is fixed to an extension 53 which, in turn, is pivotally connected to a lever 54. As shown in FIG. 9, the lever 54 extends from and is fixedly secured to the shaft 45 which is secured within the vane 14.

Upon rotation of the flyweight 48, the rod 50 causes pivoting of the lever 54 and thus pivoting of the shaft 45 and vane 14 about the axis 16.

The flyweight assembly 47 also includes a pair of rests 55 which are mounted within the strut 44 in order to limit arcuate movement of the flyweight 48 in opposite directions. In addition, the flyweight assembly includes a tensioning means 56 for biasing the flyweight 48 towards one of the rests 55. As indicated, the tensioning means 56 includes a spring 57 which is connected to the rocker arm 51 and which extends substantially tangential to an arc of rotation of a blade 13. The opposite end of the spring 57 is secured to a cable 58 which passes about a roller 59 rotatably mounted in the strut 44. The opposite end of the cable 58 is connected to a means 60 for varying the tension in the spring 57. For example, the adjusting means 60 may be in the form of a linear actuator mounted via suitable brackets 61 on the turbine blade 13.

As shown in FIG. 8, a damping means 62 is also mounted within the strut 44 and connected to the rocker arm of the flyweight 48 in order to dampen movement of the flyweight 48 between the rests 55.

During operation, the flyweight 48 is permitted to rotate between the rests 55 about the pivot pin 49. During rotation, the rod 50 moves substantially parallel to the strut 44 and causes pivoting of the lever 54 and, thus, pivoting of the vane 14. During this time, the flyweight 48 moves from the position A as shown in solid line in FIG. 8 to the position B as shown in dotted line while the vane 14 moves from a position A' shown in solid line in FIG. 9 to position B'. As the rotor assembly reaches the rated circular velocity, the flyweight 48 overcomes the tensional restraint of the spring 57 and begins to rotate toward the position B. The angle of rotation 63 is such as to equalize the moment arms of the flyweight 48 and the spring 57, thus causing the flyweight 48 to rotate through the arc A-B without resistance except for mechanical bearing friction. This angle 63 is adjustable to allow full flyweight rotation from position A to B at a circular velocity increase of less than one half of one percent. Thus, pitch changes from 0 to maximum lift are obtained within this circular velocity increment.

In order to vary the tension in the spring 57, the linear actuator 60 has a motor 64 which drives a lead screw 64' on which an arbor 65 is mounted and fixed to the cable 58. Actuation of the actuator 60 permits a change in the flyweight rotation from position A to position B relative to the rotor speed. Higher tension requires greater circumferential rotational speed before the flyweight 48 begins to change the pitch of the vane 14. Likewise, lower tension requires less circumferential rotational speed.

The linear actuator 60 can be controlled remotely, for example by a switch located at ground level. In this case, suitable sensors may be located on the blade 13 adjacent to the actuator in order to indicate the position of the arbor 65.

As shown in FIG. 8, the position of the spring 57 is tangential to the arc of rotation. Thus, insignificant tension changes occur under operational centrifugal force. Further, the rod 50 remains in constant angular position relative to the rocker arm of the flyweight 48 in order to avoid undesirable secondary forces which might otherwise impair the rotation of the flyweight through the arc A-B.

Since the flyweight 48 tends to accelerate in the down arc and decelerate in the up arc, as viewed, of each blade rotation, the rotating motion of the flyweight 48 is damped by the damping means 62.

As indicated, the strut 44 and the means for rotating the vane are shrouded by an aerodynamic fairing 66.

Referring to FIG. 1, the sweep radius of each vane 14 relative to the swept disk area is chosen so as to have the least pitch mismatch with the blades at wind speeds other than the design point. For example, for a design point wind velocity of 7.5 meters per second and 107 revolutions per minute (RPM) turbine speed, the sweep radius of the vane 14 is at 75% of blade tip radius. The blade lift is controlled by the pitch control vane 14 in similar manner as elevators control wing lift in an airplane. The control force is related to the pitch control vane area and/or moment arm as governed by the length of the strut 44.

Referring to FIG. 3, the basic operation of a pitch control vane 14 can be explained as follows. With the rotor blade 13 moving parallel to the rotational vane at a velocity $r\omega$ and with a wind velocity and direction of the blade of $V_{rel}$, the chord of the blade 13 is pitched to positive lift by a pitch angle $+\alpha$. This angle is maintained by the trailing pitch control vane 14 which is in a position $+\alpha$ relative to the blade chord. Thus, optimum lift is maintained regardless of $V_{rel}$. As the blade reaches a design rotational velocity $r\omega$, the flyweight 48 (FIG. 8) begins to deflect, altering the pitch angle of the pitch control vane toward $-\alpha$. This causes an equivalent pitch change of the blade 13 and a resulting reduction of lift. As a load is connected, $r\omega$ decreases, causing the flyweight 48 to retract thus causing $\alpha$ to increase positive, thus restoring lift to supply power as per demand. Wind velocity changes cause minute accelerations or decelerations, changing $\alpha$ to compensate by decreasing/increasing lift. At no load condition, $\alpha$ will become negative until lift is equal to mechanical friction and aerodynamic systems losses. This also provides a full overspeed control, making cut-out or shut down wind speed provisions unnecessary.

Referring to FIG. 10, the base 12 is formed by a vertically disposed hollow stem 66 and a tube 67 which is rotatably mounted concentrically about the stem 66. As shown, the stem 66 is secured, for example, by welding, to a base plate 68 which, in turn, is secured by bolts 69 to a concrete foundation 70. A suitable mounting pad 71 may also be disposed between the base plate 68 and foundation 70. The base plate 68 is provided with a central aperture for passage of a conduit 72. As indicated, the conduit 72 extends from the interior of the stem 66 downwardly through the foundation 70 to a suitable external terminal (not shown).

The tube 67 encircles the stem 66 with a small clearance and is rotatable relative to the stem 66 via a suitable bearing 73 which is fixed between the lower end of the tube 67 and the lower end of the stem 66. In addition, a bearing 74 is provided at the upper end of the tube 67 between a flange plate 75 of the tube 67 and a flange 76 and hollow shaft 77 of the stem 66.

As shown, the lower end of the mast 11 is hinged to the tube 67 via a hinge assembly 78 and is pinned at a higher point to the tube 67 via a bracket and pin assembly 79. As indicated in FIG. 12, the hinge assembly 78 includes a pair of bracket plates 80 which are fixed to the tube 67 and which carry a pin 81 therebetween. The mast 11, in turn, carries a sleeve 82 which is journaled about the pin 81. The bracket and pin assembly 79, as shown in FIG. 11, includes a pair of bracket plates 83 which are fixedly secured to the tube 67, a pin 84 which passes through the plates 83 and a pair of bracket plates 85 which are fixedly secured to the mast 11 and are journaled on the pin 84.

As shown in FIG. 10, a collector ring assembly 86 is disposed on the upper end of the tube 67 and is connected to the wiring w of the generator 18 (FIG. 4) which leads out of the mast 11 via conduit 87. A suitable lead 88 extends from the collector ring assembly 86 downwardly through the tube 77 and conduit 72 to the external terminal (not shown). A suitable cover 89 is disposed on the tube 67 over the collector ring assembly 86 with an opening for passage of the conduit 87.

During operation, should the direction of a wind shift, the mast 11 will rotate about the vertical axis of the base 12 so as to orient the rotor assembly 10. In this regard, the rotatable base 12 permits free rotation of the system. The angular relationship of the mast 11 to the base 12 allows the rotor assembly 10 to be positioned downwind of the vertical axis of the base 12. Thus, a mechanical couple is created anytime the wind direction deviates from the in-line-downwind direction, causing, by wind resistance of rotor and lift of mast and rotors, the system to realign itself with the wind into an in-line-downwind direction.

Of note, a control panel (not shown) can be mounted to ground level with various controls for the electrical components of the WECS. As shown in FIG. 4, a suitable collector plate 90 can be mounted in fixed relation to the frame 17 while facing the rotatable hub plate 23 to effect an electrical connection between a cable 91 running through the mast 11 and the electrically actuated components on the blades 13, e.g. the actuators 60.

The invention thus provides a relatively efficient wind energy conversion system which is constructed in a simple manner. The major components of the system includes a multibladed rotor assembly with an in-line power train, a mast, a rotating base, and a foundation.

What is claimed is:
1. A wind energy conversion system comprising
a rotor assembly disposed on a horizontal axis, said rotor assembly including at least one pivotally mounted turbine blade disposed in a radiating manner for rotation about an aerodynamic axis perpendicular to said horizontal axis, and a pitch control vane mounted on said turbine blade for moving said turbine blade into a deliberate angle of attack in relation to a relative wind passing over said blade.

2. A wind energy conversion system as set forth in claim 1 wherein said vane is fixed to said blade in the outer third of said blade.

3. A wind energy conversion system as set forth in claim 1 which further comprises means for rotating said vane in response to the angular velocity of said turbine blade exceeding a predetermined angular velocity to cause said turbine blade to rotate on said aerodynamic axis in a direction to vary the angular velocity of said blade.

4. A wind energy conversion system as set forth in claim 3 wherein said means for rotating said vane includes a strut connected between said blade and said vane and a centrifugal flyweight assembly disposed within said strut and connected to said vane for rotating said vane whereby at increasing speeds of said blade, said vane is rotated to change said angle of attack of said blade to decrease the torque of said blade.

5. A wind energy conversion system as set forth in claim 4 wherein said means for rotating said vane further includes a shaft secured to said vane along a pivot axis and pivotally mounted in said strut and said flyweight assembly includes a flyweight rotatably mounted in said strut, a rod pivotally connected at one end to said flyweight, and a lever secured to said shaft and articulated to said rod at an opposite end thereof whereby rotation of said flyweight causes pivoting of said lever and said shaft about said pivot axis.

6. A wind energy conversion system as set forth in claim 5 wherein said flyweight assembly further includes a pair of rests mounted in said strut to limit movement of said flyweight in opposite directions and tensioning means for biasing said flyweight towards one of said rests.

7. A wind energy conversion system as set forth in claim 6 wherein said tensioning means includes an elongated spring in said strut secured between said rod and a fixed point substantially tangential to an arc of rotation of a blade.

8. A wind energy conversion as set forth in claim 7 wherein said tensioning means includes means for varying the tension in said spring.

9. A wind energy conversion system as set forth in claim 6 wherein said flyweight assembly includes a rocker arm pivotally mounted in said strut with said rod pivotally secured at one end thereof, a spring secured at an opposite end of said rocker arm and extending along and within said strut, and means secured to said spring for varying the tension in said spring.

10. A wind energy conversion as set forth in claim 9 wherein said latter means is a linear actuator.

11. A wind energy conversion as set forth in claim 9 which further comprises a damping means connected to said flyweight for damping movements of said flyweight between said rests.

12. A wind energy conversion as set forth in claim 6 which further comprises a damping means connected to said flyweight for damping movements of said flyweight between said rests.

13. A wind energy conversion system comprising a mast mounted for rotation about a vertical axis; a rotor assembly mounted on said mast at an upper end thereof, said rotor assembly including a shaft rotatably mounted about a horizontal axis, a hub plate mounted on said shaft, a plurality of turbine blades mounted on said hub plate, each said blade being rotatable about an aerodynamic axis perpendicular to said horizontal axis, and a plurality of pitch control vanes, each said vane being mounted on a respective blade for moving said blade into a deliberate angle of attack in relation to a relative wind passing over said respective blade; and a generator about said shaft for generating an electrical current during rotation of said shaft.

14. A system as set forth in claim 13 which further comprises a gravity neutralization means connecting said blades together to rotate simultaneously about said respective aeordynamic axes thereof.

15. A system as set forth in claim 14 wherein said means includes a bevel gear mounted on said hub plate and a plurality of pinion gears in mesh with said bevel gear, each said pinion gear being mounted on a respective blade.

16. A system as set froth in claim 15 which further includes a centrifugal torque neutralizing means connected to said blades.

17. A system as set forth in claim 16 wherein said centrifugal torque neutralizing means includes a drive gear secured to said bevel gear for rotation therewith, a pair of driven gears rotatably mounted on said hub plate on respective axes in meshing engagement with said drive gear and a pair of flyweights, each flyweight being connected to a respective driven gear to pivot about said axis thereof.

18. A system as set forth in claim 17 which further comprises a hydraulic damper connected to said drive gear to tangentially damp said drive gear.

19. A system as set forth in claim 17 which further includes a flyweight assembly for pivoting each respective vane about an aerodynamic axis thereof in response to changes in rotational speed of said blades about said horizontal axis.

20. A system as set forth in claim 16 which further comprises a damper for damping rapid rotational fluctuations of said blades.

21. A system as set forth in claim 14 which further comprises a centrifugal torque neutralizing means connected to said blades.

22. A system as set forth in claim 21 which further includes a flyweight assembly for pivoting each respective vane about an aerodynamic axis thereof in response to changes in rotational speed of said blades about said horizontal axis.

23. A system as set forth in claim 22 which includes a strut connected between each blade and a respective vane and a shaft secured to each vane along a pivot axis and pivotally secured in said shaft and wherein each flyweight assembly includes a flyweight rotatably mounted in said strut, a rod pivotally connected at one end to said flyweight, and a lever secured to said shaft and articulated to said rod at an opposite end thereof whereby rotation of said flyweight causes pivoting of said lever and said shaft about said pivot axis.

24. A system as set forth in claim 23 which further comprises a pair of rests mounted in said strut to limit movement of said flyweight in opposite directions and tensioning means for biasing said flyweight towards one of said rests.

25. A system as set forth in claim 13 which further comprises a base having a vertically disposed hollow stem and a tube rotatably mounted concentrically about said stem, and wherein said mast is connected to said tube of said base angularly of said vertical axis and has a symmetrical air foil cross-section.

26. A system as set forth in claim 25 which further comprises a collector ring assembly disposed on said tube, at least one cable passing through said mast to connect said generator to said collector ring assembly and a lead extending from said collector ring assembly through said stem to an external terminal.

27. A wind energy conversion system comprising
 a rotatably mounted hub plate disposed for rotation about a horizontal axis;
 a plurality of turbine blades mounted on said hub plate in a radiating pattern, each said blade being rotatable about an aerodynamic axis perpendicular to said horizontal axis; and
 a plurality of pitch control vanes, each said vane being mounted on a respective blade for moving said blade into a predetermined angle of attack.

28. A wind energy conversion system as set forth in claim 27 which further comprises a mast, a shaft rotatably mounted on an upper end of said mast and connected to said hub plate, and a electrical generator connected to said shaft to generate an electrical current during rotation of said shaft and hub plate.

29. A wind energy conversion system as set forth in claim 28 wherein said mast is rotatable about a vertical axis.

30. A wind energy conversion system as set forth in claim 29 which further comprises an electrical current take-off means at a base of said mast electrically connected to said generator.

31. In combination,
 a pitch control vane for a rotatably mounted blade, said vane having a shaft secured thereto about a pivot axis; and
 a flyweight assembly connected to said shaft for pivoting said shaft about said pivot axis, said assembly including a flyweight pivotally mounted on an axis angularly disposed to said pivot axis.

32. The combination as set forth in claim 31 which further includes a strut and a pair of rests mounted in said strut to limit movement of said flyweight in opposite directions and tensioning means for biasing said flyweight towards one of said rests.

33. The combination as set forth in claim 32 wherein said tensioning means includes a spring secured at one end to said flyweight and at an opposite end to a fixed point to bias said flyweight against said one rest.

34. The combination as set forth in claim 33 wherein said tensioning means includes means for varying the tension in said spring.

* * * * *

UNITED STATES PATENT AND TRADEMARK OFFICE
CERTIFICATE OF CORRECTION

PATENT NO. : 4,423,333
DATED : December 27, 1983
INVENTOR(S) : WENDELL E. ROSSMAN It is certified that error appears in the above—identified patent and that said Letters Patent is hereby corrected as shown below:

Column 2, line 8, change "Accordngly" to --Accordingly--

Column 5, line 63, change "Referrng to -- Referring --.

Column 7, line 47, change "rωand" to --rω and--

Signed and Sealed this

Third Day of July 1984

[SEAL]

Attest:

GERALD J. MOSSINGHOFF

Attesting Officer    Commissioner of Patents and Trademarks